United States Patent [19]

Hampson

[11] 4,214,808
[45] Jul. 29, 1980

[54] KALEIDOSCOPIC MOBILE

[76] Inventor: Edward A. Hampson, 4704 Harlan St., Suite 260, Denver, Colo. 80212

[21] Appl. No.: 954,414

[22] Filed: Oct. 25, 1978

[51] Int. Cl.² ............................................. G02B 27/08
[52] U.S. Cl. ....................................... 350/4.1; 40/617; 46/32; 272/8 M; 272/31 R
[58] Field of Search .................. 350/4.2; 40/409, 411, 40/412, 427, 439, 446, 473, 617; 46/37, 32, 47; 428/542; 272/8 M, 31 R; 362/806, 808

[56] References Cited

U.S. PATENT DOCUMENTS

| | | | |
|---|---|---|---|
| 2,769,276 | 11/1956 | Steiner | 46/32 |
| 3,675,362 | 7/1972 | DeGelder et al. | 46/32 X |
| 3,699,704 | 10/1972 | Hakim | 46/32 |
| 3,762,084 | 10/1973 | Jones | 40/617 X |
| 3,803,735 | 4/1974 | Stubbmann | 46/32 X |
| 3,919,795 | 11/1975 | Jinivisian et al. | 46/32 X |
| 3,927,482 | 12/1975 | Marcus | 40/617 X |
| 3,978,610 | 9/1976 | Stubbmann | 46/32 |
| 4,147,344 | 4/1979 | Lee | 46/32 |

*Primary Examiner*—Richard A. Wintercorn
*Attorney, Agent, or Firm*—Ancel W. Lewis, Jr.

[57] ABSTRACT

A mobile comprising a frame supporting an arrangement of rotatable display objects displaying selected visual contrasts and a reflective object for reflecting images from the display objects. Each display object is of a three-dimensional form and has a plurality of display surfaces with different contrasting colors and contrasting patterns. The display objects are supported for rotation about individual axes mounted to a support frame. The display objects are also mounted on the support frame for rotation about a common central axis. Rotation of the display objects by air currents or by hand about their individual axes and about the central common axis produces a continuously changing arrangement of display surfaces and continuously changing high-contrast reflections on the reflective object.

18 Claims, 10 Drawing Figures

| Green | Red | Blue | Yellow | Blue & White Checker Board | Red & White Concentric Circles |
| Man's Face | Blue & White Stripes | Red & White Concentric Squares | Red & White Divided Triangle | Black on White Print | Blue & White Stripes |
| Red & White Checker Board | Red & White Star Burst | Woman's Face | Red & White Stripes | Blue & White Diamonds | Green & White Concentric Circles |
| Yellow & Black Spiral | Blue & White Concentric Squares | Yellow & Black Modified Star Burst | Black & Yellow Stripes | Red / Green / Yellow / Blue | White, Blue, & Yellow Clover |

Red  Yellow  Blue  Green

Red  Yellow  Blue

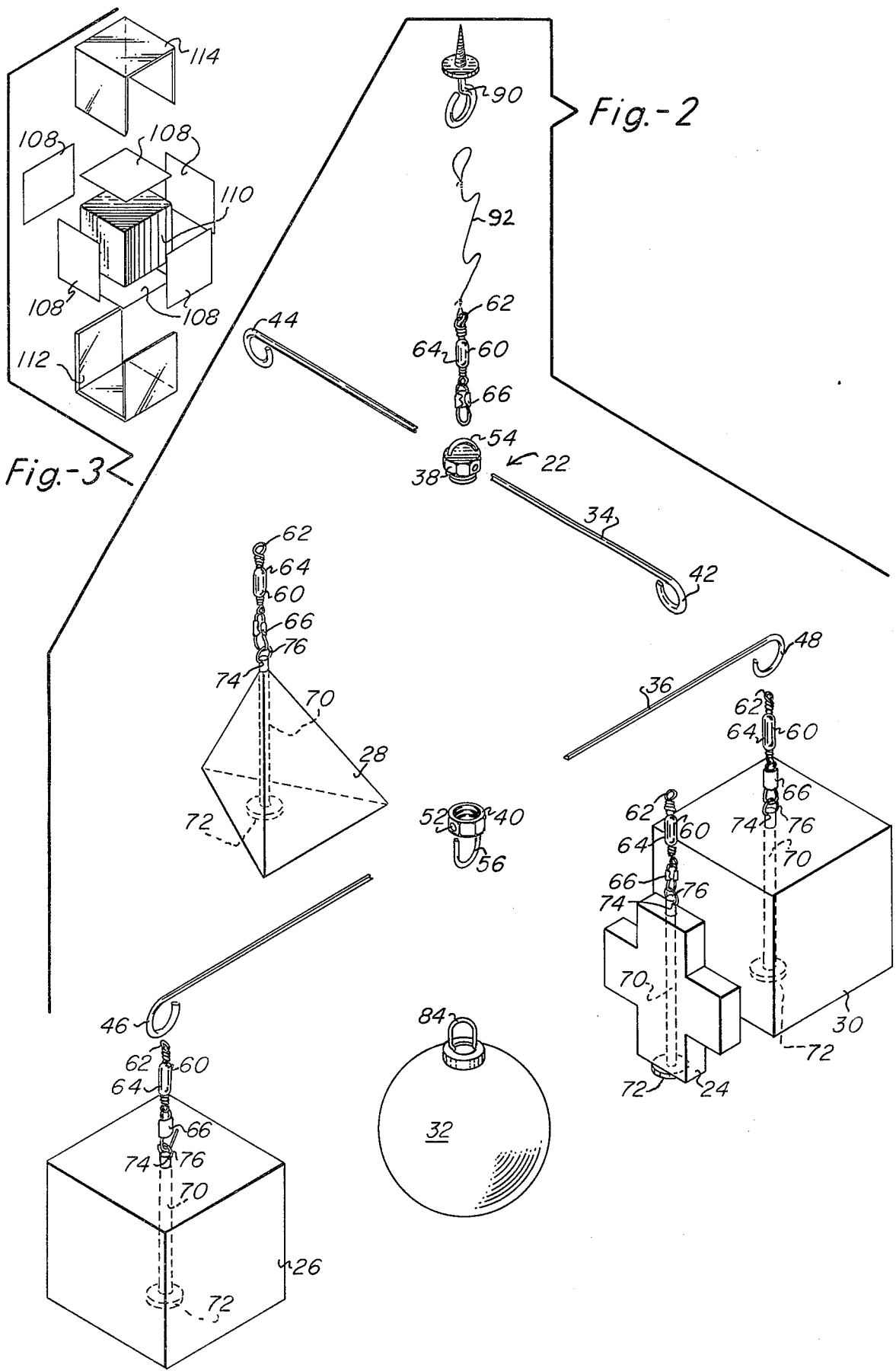

KALEIDOSCOPIC MOBILE

FIELD OF THE INVENTION

This invention relates to mobiles and more particularly to a novel kaleidoscopic mobile having a plurality of display objects with different colors, patterns, and color contrasting patterns thereon arranged to rotate about different axes to produce a continuously changing arrangement of display surfaces and continuously changing reflections on a central reflective object.

DESCRIPTION OF THE PRIOR ART

Mobiles heretofore provided for entertaining and occupying infants and children have been constructed with moving display objects such as animate objects or objects with various patterns for viewing by the infants or children. U.S. Patent No. 3,762,084, for instance, discloses a mobile having an arrangement of movable fish-like objects. U.S. Pat. Nos. 3,803,735 and 3,919,795 disclose mobiles having arrangements of animate objects and pattern objects that may be mechanically rotated for viewing by a child.

A problem with prior known mobiles is that infants eventually become bored with looking at the same particular arrangement of objects and patterns. Studies have demonstrated, for instance, that after the age of ten weeks infants seem to prefer looking at new or different objects or pattern arrangements rather than the same old thing. In addition, several studies have clearly established the fact that infants show the greatest amount of interest in patterns of sharply contrasting colors, patterns, and colored patterns. This preference for color contrasting patterns is twice as great as that for plain-colored surfaces, and it is true for infants of all ages. A baby is apparently born with the ability to perceive patterns, and as he grows older his ability to perceive detail increases as well as his preference for patterns of increasing complexity.

No mobile has been found that utilizes display objects with combinations of different contrasting colors, patterns and color contrasting patterns or an easily changeable or continuously variable display arrangement to hold a child's attention and high interest. The kaleidoscopic mobile of the present invention, on the other hand, is constructed to allow a plurality of viewing objects with different contrasting colors, patterns and color contrasting patterns to be rotated for viewing and easily rearranged and replaced for changing the display. In addition, a reflective central display object reflects contrasting images from the display objects and presents continuously varying contrasting reflections for viewing for maintaining a child's interest.

Accordingly, it is a general object of the present invention to overcome some of the deficiencies in prior known mobiles with a simple yet highly effective mobile.

Another object of the present invention is to provide a mobile with an arrangement of rotatable display objects having a plurality of display surfaces with different color contrasting patterns and a central reflective objects for continuously reflecting images from the display objects.

A further object of the present invention is to provide a mobile with a plurality of three-dimensional display objects that are easily replaceable and rearrangeable.

Yet another object of the present invention is to provide a mobile with a plurality of display objects each rotatable about an axis and about a common central axis.

SUMMARY OF THE INVENTION

A kaleidoscopic mobile comprising a suspensible support frame with an arrangement of freely rotatable display objects having a plurality of display surfaces formed with different contrasting colors, contrasting patterns, and color contrasting patterns thereon and a central reflectic object for reflecting images from the display surfaces. Each display object preferably is of a three-dimensional form and is supported for rotation about a rotational axis on snap swivels mounted to the support frame. In addition, the support frame is adapted to be suspended from a ceiling or the like on a cord and on an additional snap swivel such that the display objects are also freely rotatable about a common central axis. The rotation of the display objects by air currents or by hand about their individual rotational axes and about the central common axis produces a display of different contrasting colors, contrasting patterns, and color contrasting patterns and continuously changing reflections on the reflective object.

Other objects, advantages and capabilities of the present invention will become more apparent as the description proceeds, taken in conjunction with the accompanying drawings in which like parts have similar reference numerals and in which:

FIG. 1 is a perspective view showing a kaleidoscopic mobile constructed in accordance with the present invention;

FIG. 2 is an exploded perspective view showing the component parts of the kaleidoscopic mobile of FIG. 1;

FIG. 3 is an exploded perspective view showing the construction of one form of a display object;

FIG. 4 is a side elevation view of a display surface on a display object with a spiral pattern;

FIG. 5 is a side elevation view of a display surface on a display object with a colored triangle pattern;

FIG. 6 is a side elevation view of a display surface on a display object with concentric squares;

FIG. 7 is a side elevation view of a display surface with a human face;

FIG. 8 is a side elevation view of a display surface with a colored concentric circle pattern;

FIG. 9 is a side elevation view of a display surface with a colored checkerboard pattern; and FIG. 10 is a table showing some different pattern and color arrangements for different shaped display objects.

DESCRIPTION OF THE PREFERRED EMBODIMENTS

Referring now to FIGS. 1 and 2, the kaleidoscopic mobile 20 is shown and, generally stated, comprises a suspensible support frame 22, a plurality of display objects 24, 26, 28, 30 mounted on the support frame 22 for rotation about individual axes and about a common central axis, and a reflective central object 32 mounted on the support frame in a stationary position along the central axis for reflecting images from the display objects.

The support frame 22 shown comprises a first cross member 34 and a second cross member 36 mounted at right angles to one another on a mounting cap screw 38 and a mating nut 40. The cross members are fabricated from relatively small diameter metal rods or the like. Cross members 34 and 36 formed from $\frac{1}{8}''$ brass rods have been found suitable for this purpose. The ends 42 and 44 of cross member 34 and the ends 46 and 48 of cross member 36 are curled for mounting the display objects 24, 26, 28, 30.

The mounting cap screw 38 shown is a standard hex head metal cap screw. A through hole 50 is machined in the head of the mounting cap screw 38 for attaching cross member 34 to the cap screw 38. Cross member 34 is press-fitted to the through hole 50 or otherwise secured to the mounting cap screw 38. In addition, mating nut 40 of the mounting cap screw 38 has a through hole 52 for attaching cross member 36 in the same manner. A wire loop 54 is attached to the mounting cap screw 38 by welding or soldering for mounting the support frame to a ceiling or the like, and another wire loop 56 is attached to the mating nut 40 for attaching the central reflective object 32.

The display objects 24, 26, 28, 30 are mounted to the curled ends 42, 44, 46 and 48 of the cross members 34 and 36 on metal snap swivels 60 but are shown in the removed position for clarity. The snap swivels 60 shown which have been found suitable are those utilized in the recreational fishing industry and have a looped end 62 that attaches to the curled ends 42, 44, 46 and 48 of the cross members 34 and 36, a rotatable swivel portion 64, and a snap 66 at the opposite end for removably attaching the display objects.

As will hereinafter be explained, the display objects 24, 26, 28 and 30 are advantageously fabricated from a lightweight material such as paper. Each display object is secured to a mounting rod 70 that slidably inserts and extends through a bore hole in the display object from end to end and has a circular disc 72 attached at one end for retaining the display objects on the rod 70. The mounting rods 70 are formed with eyelets 74 at one end which are attached to rings 76 that attach to the snap swivels 60. With this arrangement the display objects 24, 26, 28, 30 may be removably suspended from the support frame 22 and spaced a selected distance apart from one another with each display object freely rotatable about an individual rotational axis. The individual rotational axes are all located approximately parallel to one another.

The mounting cap screw 38 is attached to another swivel snap 60 which may be attached to a cord 92 for suspending the mobile from a ceiling or the like. The entire mobile, and the display objects 24, 26, 28, 30 in particular, are thus also rotatable about a common central axis.

The central reflective object 32 is mounted to the mating nut 40 of the mounting cap screw 38 along an axis coincident to this central axis. The central reflective object 32 shown is similar to a Christmas tree ornament and has a spherical shape and a highly reflective or mirror outer surface. It is understood that other reflective objects with other shapes, preferably three-dimensional, may be utilized as reflective object 32.

The central reflective object 32 is provided with a mounting head 84 for removably attaching the central reflective object 32 to the wire loop 56 on the mating nut 40 of the mounting cap screw 38. In the form of the invention shown the central reflective object is situated in a plane vertically higher than the plane of the display objects 24, 26, 28, 30, which allows reflections from the central reflective object to be more clearly viewed along a line of sight through the display objects. In addition, in the embodiment shown the central reflective object 32 is mounted in a stationary position relative to the support frame but it is understood that object 32 may be mounted for rotation with respect to the support frame and display objects.

For mounting the mobile 20 to a ceiling or the like, an anchor screw 90 is attached to the ceiling and a cord 92 may be attached to the anchor 90 and to the snap swivel 60 on the mounting cap screw 38 of the support frame. As shown in FIG. 2, with this mounting arrangement each display object 24, 26, 28, 30 is rotatable about an associated vertical axis, as indicated by arrows 100, 102, 104 and 106, about an individual axis and the entire mobile is rotatable, as indicated by arrow 108, about a common central axis. Since a variety of different color contrasting patterns and colors are formed on the different display surfaces of the display objects 24, 26, 28, 30, rotation of the display objects by hand or by air currents about the different rotational axes produces continuously changing reflections on the central reflective object 32. In addition, the rotation of the different display surfaces presents a continuously changing arrangement of patterns for viewing.

With this arrangement of the display object, its display surfaces and the reflective object, a pattern represented as an arrow at 21 shown on one surface of object 28 is reflected from the display surface as an image 21a. When viewed from the bottom along a sight line through the central axis of the sphere, as by a small child lying in a crib and looking up toward the mobile, there would be seen both the bottom display surfaces of each display object and a reflected image from a side wall opposite the reflective object in each quadrant of the sphere. These reflected images are continuously changing as the objects rotate about their respective axes of rotation. The display surfaces of the display objects being at all times opposite the reflective surface of the reflective object, there would be seen reflected images from almost any line of sight toward the mobile. While four display objects are shown, it is understood that fewer than or more than four and as few as one reflective object and one display object may be used.

The term "pattern" as used herein is intended to refer to selected designs, drawings, newsprint, artwork, and the like. A "high contrast surface" as used herein refers to contrasting colors, contrasting patterns and color contrasting patterns consistent with those in the illustrated examples. The three-dimensional geometric shapes for the objects may include prisms, cones, cylinders and the like.

The display objects 24, 26, 28 and 30 shown are all three-dimensional forms with a plurality of display surfaces formed with various contrasting solid colors, contrasting patterns and various color contrasting patterns thereon. In the form shown display object 24 is formed in the general shape of a cross, display objects 26 and 30 are cubes of identical size and shape, and display object 28 is a cone. It is understood that the display objects may be formed in any shape or form that permits a plurality of display surfaces to be formed with a variety of different contrasting colors, patterns, and color contrasting patterns.

In addition, it has been found that the display objects may be fabricated from any suitable lightweight material such as paper, wood, plastic, styrofoam, or the like. One suitable construction for a display object is shown in FIG. 3. In the form shown in FIG. 3 paper sheets 108 formed with artwork of different colors and color contrasting patterns are affixed to the six sides of a styrofoam cube 110 to form a variety of display surfaces. A two-piece 112 and 114 transparent plastic covering is then fitted around the paper sheets 108 and styrofoam cube 110 to rigidify and protect the assembly.

As an alternative construction, solid wood blocks are formed in the desired shape and the external surfaces are silk-screened with different colors, patterns and color contrasting patterns, or cardboard cutouts having different colors and color contrasting patterns printed thereon may be formed in the desired shapes. The display objects may then be supported on a mounting rod 70 and attached to the snap swivels 60, as illustrated in FIGS. 1 and 2 or, in the alternative, attached to the snap swivels 60 in any other suitable manner.

In FIGS. 4 through 9 there are shown several different patterns and color contrasting patterns which have been found to be effective on the display surfaces of the display objects shown. FIG. 4 shows a spiral pattern which may be colored in bright and sharply contrasting colors such as brown and yellow so as to be high contrast patterns. FIG. 5 shows a pattern of triangles which may be colored in different bright and highly contrasting colors such as blue, red, green and yellow. FIG. 6 shows an arrangement of squares framed in bright contrasting colors such as red and white. FIG. 7 shows the image of a human face which may be colored in bright contrasting colors such as black and white. FIG. 8 shows a pattern of concentric color contrasting circles such as bright red and white. FIG. 9 shows a checkerboard pattern of bright contrasting colors such as bright blue and white.

As an alternative, the display objects may be formed with display surfaces formed with any other color contrasting patterns or solid colors such that a variety of continuously changing reflections can be formed on the reflective object as the display objects are rotated. In addition, because the display objects are removably mounted on the snap swivels, the mobile may be easily rearranged and different display objects in different combinations may be utilized to present even more variety.

For further orientation versatility, each display object is provided with a bore hole for mounting rod 70 extending between a pair of opposite faces, which for a cube would be three intersecting bore holes with an opening in each of the six faces so that the orientation is changed by inserting the rod in a selected of the three bore holes. The table shown in FIG. 10 presents some color and pattern arrangements for different shaped display objects that have been found to be especially effective in a mobile of this type.

Although the present invention has been described with a certain degree of particularity, it is understood that the present disclosure has been made by way of example and that changes in details of structure may be made without departing from the spirit thereof.

What is claimed is:

1. In a mobile the combination comprising:
 a reflective object having an exterior mirror surface; and
 a display object having a plurality of display surfaces displaying selected visual contrasts and mounted for rotation about a rotational axis opposite said mirror surface such that images from said display surfaces are successively reflected from said mirror surface upon the rotation of said display object and appear as continuously changing visual contrasts on said mirror surface.

2. In a mobile as recited in claim 1 wherein there are a plurality of display objects spaced a selected distance from one another and from said mirror surface, each of said display objects having a plurality of display surfaces and mounted for rotation about a rotational axis for producing a succession of reflected images on said reflective object.

3. In a mobile as recited in claim 2 wherein said display objects are rotatable about a common axis.

4. In a mobile as recited in claim 1 wherein at least one of said display surfaces has a color contrasting pattern thereon.

5. In a mobile as recited in claim 1 wherein at least one of said display surfaces has a selected bright color.

6. In a mobile as recited in claim 1 wherein at least one of said display surfaces has a selected color contrast.

7. In a mobile as recited in claim 1 wherein at least one of said display surfaces has a selected pattern.

8. In a mobile as defined in claim 1 wherein said display surfaces have selected combinations of bright colors and color contrasting patterns.

9. A mobile comprising:
 a support frame;
 a plurality of spaced display objects having a plurality of display surfaces each with a selected visual contrast, each said display objects being mounted to said support frame for rotation about an associated rotational axis and mounted for rotation about a central common rotational axis; and
 a generally spherical central object having a mirror surface mounted to said support frame along said central axis generally opposite said display objects to produce continuously changing reflections of said visual contrasts from said mirror surface as said display objects rotate about the associated rotational axis.

10. A mobile as recited in claim 9 wherein said display objects are of a three-dimensional selected geometric shape and include at least one cube.

11. A mobile as recited in claim 9 wherein said display objects are of a three-dimensional selected geometric shape and include at least one cube.

12. A mobile as recited in claim 9 wherein said central object is disposed in a plane vertically higher than the plane of said display objects.

13. A mobile as recited in claim 9 wherein said display objects are removably mounted to said support frame on snap swivels.

14. A mobile as recited in claim 9 wherein said support frame includes two cross members attached at right angles to one another attached to a swivel connection adapted to be suspended from a cord.

15. A mobile as recited in claim 14 wherein said display objects are removably attached to snap swivels mounted to the ends of said cross members.

16. A mobile as defined in claim 9 wherein said display objects are fabricated from cardboard.

17. A mobile as defined in claim 9 wherein said display objects each comprise:
 a styrofoam cube;
 a plurality of paper prints with different bright colors and color contrasting patterns printed thereon for attachment to the sides of said styrofoam cube; and
 a plastic outer covering for said paper prints and styrofoam cube.

18. A kaleidoscopic mobile comprising:

a support frame adapted to be suspended from a point of support, said support frame including two cross members connected at right angles to one another, each cross-member having an outer end portion;

a three-dimensional display object suspended from each of said outer end portions to rotate about an associated vertical axis of rotation, said objects spaced a selected distance from one another and from a common central axis, each of said display objects having a plurality of display surfaces in different planes opposite to and successively facing said central axis as said objects rotate about its vertical axis of rotation and at least one display surface normal to said common axis and opposite said support frame and viewed from below said objects, said display surfaces having a combination of different sharp visual contrasts including contrasting colors, contrasting patterns, and color contrasting patterns, at least two of said display objects being in the shape of a cube having four side and one bottom display surfaces; and a spherical reflective object having an exterior mirror surface suspended from the intersection of said cross members and coincident with said common central axis arranged for successively reflecting changing images from display surfaces that appear as continuously changing visual contrasts as said display objects are rotated about their associated axes.

* * * * *